(12) United States Patent
Matsumoto et al.

(10) Patent No.: US 9,169,347 B2
(45) Date of Patent: Oct. 27, 2015

(54) EPOXY RESIN CURING AGENT, EPOXY RESIN COMPOSITION, AND ADHESIVE AGENT FOR LAMINATE

(75) Inventors: Nobuhiko Matsumoto, Kanagawa (JP); Eiichi Honda, Kanagawa (JP); Kana Kumamoto, Kanagawa (JP)

(73) Assignee: MITSUBISHI GAS CHEMICAL COMPANY, INC., Tokyo (JP)

(*) Notice: Subject to any disclaimer, the term of this patent is extended or adjusted under 35 U.S.C. 154(b) by 0 days.

(21) Appl. No.: 13/640,158

(22) PCT Filed: Apr. 18, 2011

(86) PCT No.: PCT/JP2011/059524
§ 371 (c)(1),
(2), (4) Date: Oct. 9, 2012

(87) PCT Pub. No.: WO2011/132637
PCT Pub. Date: Oct. 27, 2011

(65) Prior Publication Data
US 2013/0028540 A1    Jan. 31, 2013

(30) Foreign Application Priority Data
Apr. 21, 2010  (JP) .................................. 2010-097920

(51) Int. Cl.
*B32B 23/00* (2006.01)
*C08G 59/56* (2006.01)
*C08G 59/40* (2006.01)
*C09J 163/00* (2006.01)

(52) U.S. Cl.
CPC ............ *C08G 59/56* (2013.01); *C08G 59/4014* (2013.01); *C09J 163/00* (2013.01); *Y10T 428/31515* (2015.04)

(58) Field of Classification Search
CPC ... Y10T 428/31515; B32B 1/02; C08L 63/00; C08G 59/56; C08G 59/4014; C09J 163/00
USPC ..................... 428/34.1, 34.2, 35.7, 35.9, 36.9
See application file for complete search history.

(56) References Cited

U.S. PATENT DOCUMENTS

| | | | |
|---|---|---|---|
| 5,302,430 A | 4/1994 | Ardéchir et al. | 428/35.7 |
| 5,387,368 A | 2/1995 | Nishimura et al. | 252/188.28 |
| 7,208,538 B2 * | 4/2007 | Taylor et al. | 524/397 |
| 7,425,598 B2 * | 9/2008 | Kutsuna et al. | 525/531 |
| 8,128,782 B2 | 3/2012 | Yonehama et al. | 136/330 |
| 2007/0049708 A1 | 3/2007 | Kutsuna et al. | 525/529 |
| 2012/0321227 A1 | 12/2012 | Kumamoto et al. | 383/107 |

FOREIGN PATENT DOCUMENTS

| | | |
|---|---|---|
| EP | 1826000 A1 * | 8/2007 |
| JP | 5-51574 | 3/1993 |
| JP | 5-140555 | 6/1993 |
| JP | 6-41422 | 2/1994 |
| JP | 9-316422 | 12/1997 |
| JP | 2000-154365 | 6/2000 |
| JP | 2002-256208 | 9/2002 |
| JP | 2003-251775 | 9/2003 |
| JP | 2004-27014 | 1/2004 |
| JP | 2009-167335 | 7/2009 |
| WO | 99/60068 | 11/1999 |

OTHER PUBLICATIONS

Search report from International Application No. PCT/JP2011/059524, mail date is May 31, 2011.

* cited by examiner

*Primary Examiner* — Marc Patterson
(74) *Attorney, Agent, or Firm* — Greenblum & Bernstein, P.L.C.

(57) ABSTRACT

Provided are an epoxy resin curing agent having excellent properties and high gas barrier capability that epoxy resin has and, in addition thereto, capable of realizing good adhesiveness to polyester and aluminum; an epoxy resin composition containing the curing agent; an adhesive for lamination including the composition as the main ingredient thereof; and a laminate film, a multilayer wrapping material and a wrapping bag using the adhesive. The epoxy resin curing agent comprises a reaction product of the following (A), (B) and (C): (A) meta-xylylenediamine or para-xylylenediamine, (B) a polyfunctional compound having one acyl group and capable of forming an amide group moiety through reaction with a polyamine and forming an oligomer, (C) a metal (meth)acrylate salt with a divalent or more polyvalent metal.

9 Claims, No Drawings

EPOXY RESIN CURING AGENT, EPOXY RESIN COMPOSITION, AND ADHESIVE AGENT FOR LAMINATE

TECHNICAL FIELD

The present invention relates to an epoxy resin curing agent capable of giving a good gas barrier property, a long pot life and excellent adhesiveness, and to an epoxy resin composition containing the curing agent. The present invention also relates to an adhesive for lamination comprising the epoxy resin composition as the main ingredient thereof, and to a laminate film, a multilayer wrapping material and a wrapping bag using the adhesive.

BACKGROUND ART

Recently, from the reasons for the strength, the ability to protect products, the working aptitude, the advertising effects by printing and others of wrapping materials, composite flexible films comprising a combination of different types of polymer materials have become the mainstream thereof. Such a composite film generally comprises a thermoplastic plastic film layer or the like to be the outer layer having the role of product protection and another thermoplastic plastic film or the like to be a sealant layer; and for laminating these layers, employed is a dry lamination method comprising applying an adhesive to a laminate film layer followed by adhering a sealant layer thereto, or an extrusion lamination method comprising adhering under pressure a plastic film to be a sealant layer, which has been optionally coated with an anchor coat layer and fused, to a laminate film layer. As the adhesive to be used in these methods, the mainstream is a two-component polyurethane-based adhesive that comprises a main agent having an active hydrogen group, such as a hydroxyl group or the like and a curing agent having an isocyanate group, from the viewpoint of high adhesiveness thereof (for example, see Patent Reference 1, Patent Reference 2).

However, in general, the curing reaction with such a two-component polyurethane-based adhesive of the type is not so high, and therefore, curing acceleration through long-term aging for from 1 to 5 days is needed after lamination, for securing sufficient adhesiveness. In addition, in this, a curing agent having an isocyanate group is used, and consequently, in case where an unreacted isocyanate group has remained after curing, the remaining isocyanate group would react with moisture in air to generate carbon dioxide, therefore providing a problem in that bubbles would be formed in the laminate film.

On the other hand, as a method for solving the problems, Patent Reference 3 proposes a specific polyurethane-based adhesive for dry lamination, and Patent Reference 4 proposes an epoxy-based adhesive for lamination.

However, the gas barrier properties of the polyurethane-based adhesives in Patent References 1 to 3 and the epoxy-based adhesive proposed by Patent Reference 4 are not high, and therefore, in case where a gas barrier properties is required for wrapping materials, it is necessary to additionally laminate various gas barrier layers, such as a polyvinylidene chloride (PVDC) coat layer, a polyvinyl alcohol (PVA) coat layer, an ethylene-vinyl alcohol copolymer (EVOH) film layer, a metaxylyleneadipamide film layer, an inorganic substance-deposited film layer with an alumina ($Al_2O_3$), silica (Si) or the like deposited thereon, etc. For these reasons, the adhesives have some disadvantages in point of the production cost for laminate films and the working steps in lamination therewith.

On the other hand, epoxy resin has many excellent characteristics, such as adhesiveness to various substrates, heat resistance, chemical resistance, electric properties, mechanical properties and others, as compared with other resins, and is therefore widely utilized in various industrial fields of civil engineering and building adhesives, etc. In general, the gas barrier property of the epoxy resin composition for use in an adhesive field is good as compared with that of urethane resin, acrylic resin, polyolefin resin, etc., but could not come up to that of polyvinylidene chloride, polyvinyl alcohol and the like falling within a group of gas barrier materials. Accordingly, in case where an epoxy resin is used, various attempts of increasing the thickness of the coating film, overcoating with any other material, using a filler in combination or the like are made for the purpose of enhancing the gas barrier capability thereof.

As an epoxy resin composition having a gas barrier property, Patent Reference 5 proposes an epoxy resin composition comprising an epoxy resin and amine-based curing agent. The epoxy resin composition could reveal a good performance in point of gas barrier capability, but further improvement thereof is desired these days, and in addition, the epoxy resin composition is insufficient in point of adhesiveness to polyester and aluminium that is desired to be improved.

CITATION LIST

Patent References

Patent Reference 1: JP-A 5-51574
Patent Reference 2: JP-A 9-316422
Patent Reference 3: JP-A 2000-154365
Patent Reference 4: WO99/60068
Patent Reference 5: JP-A 2002-256208

SUMMARY OF THE INVENTION

Problems that the Invention is to Solve

Objects of the present invention are to provide an epoxy resin curing agent having excellent properties and high gas barrier capability that epoxy resin has and, in addition thereto, capable of realizing good adhesiveness to polyester and aluminium, to provide an epoxy resin composition containing the curing agent, to provide an adhesive for lamination comprising the composition as the main ingredient thereof, and to provide a laminate film, a multilayer wrapping material and a wrapping bag using the adhesive.

Means for Solving the Problems

The present inventors have assiduously studied for the purpose of solving the above-mentioned problems and, as a result, have found that a specific epoxy resin adhesive, an epoxy resin composition or an adhesive for lamination comprising them as the main ingredient thereof reveals excellent properties of epoxy resin and realizes high gas barrier properties and high adhesiveness to polyester, and have reached the present invention. Specifically, the present invention includes the following:

1. An epoxy resin curing agent comprising a reaction product of the following (A), (B) and (C):
   (A) meta-xylylenediamine or para-xylylenediamine,
   (B) a polyfunctional compound having one acyl group and capable of forming an amide group moiety through reaction with a polyamine and forming an oligomer, (C) a metal (meth)acrylate salt with a divalent or more polyvalent metal.
2. The epoxy resin curing agent of the item 1, wherein (A) is meta-xylylenediamine.
3. The epoxy resin curing agent of the item 1 or 2, wherein (B) is acrylic acid, methacrylic acid, or their ester, amide, acid anhydride or acid chloride.
4. The epoxy resin curing agent of any of the items 1 to 3, wherein (C) is a metal acrylate salt with a divalent metal.
5. The epoxy resin curing agent of any of the items 1 to 4, wherein the reaction molar ratio of (C) to (A) ((C)/(A)) is from 0.05 to 0.35.
6. An epoxy resin composition containing an epoxy resin and the epoxy resin curing agent of any of the items 1 to 5.
7. The epoxy resin composition of the item 6, wherein the ratio of the active amine hydrogen number in the epoxy resin curing agent to the number of the epoxy groups in the epoxy resin (active amine hydrogen number in the epoxy resin curing agent/number of the epoxy groups in the epoxy resin) falls within a range of from 1.0 to 1000.
8. The epoxy resin composition of the item 6 or the item 7, wherein the oxygen transmission coefficient of the cured product obtained by curing the composition is at most 2.0 ml·mm/m$^2$·day·MPa (23° C., 60% RH).
9. The epoxy resin composition of any of the items 6 to 8, wherein the epoxy resin is at least one selected from an epoxy resin having a glycidylamino group derived from meta-xylylenediamine, an epoxy resin having a glycidylamino group derived from 1,3-bis(aminomethyl)cyclohexane, an epoxy resin having a glycidylamino group derived from diaminodiphenylmethane, an epoxy resin having a glycidylamino group and/or a glycidyloxy group derived from para-aminophenol, an epoxy resin having a glycidyloxy group derived from bisphenol A, an epoxy resin having a glycidyloxy group derived from bisphenol F, an epoxy resin having a glycidyloxy group derived from phenol-novolak, and an epoxy resin having a glycidyloxy group derived from resorcinol.
10. The epoxy resin composition of any of the items 6 to 8, wherein the epoxy resin is an epoxy resin having a glycidylamino group derived from meta-xylylenediamine.
11. An adhesive for lamination, comprising the epoxy resin composition of any of the item 6 to item 10, as the main ingredient thereof.
12. A laminate film produced by the use of the adhesive for lamination of the item 11.
13. A multilayer wrapping material containing at least one unit of the laminate film of the item 12.
14. A wrapping bag formed by using the multilayer wrapping material of the item 13, in which the wrapping material has a heat-sealable resin layer, and in which the wrapping material is overlaid on each other in such a manner that the surface of the heat-sealable resin layer thereof could face each other, and the edges of the outer peripheral area thereof are heat-sealed to form a sealed part.

Advantage of the Invention

According to the present invention, there are provided an epoxy resin curing agent that realizes a high gas barrier property, a long pot life and excellent adhesiveness to various polymers, paper, metals and others, an epoxy resin composition containing the curing agent, an adhesive for lamination comprising the composition as the main ingredient thereof, and a laminate film, a multilayer wrapping material and a wrapping bag using the adhesive. In particular, the adhesive for lamination of the present invention has high adhesiveness to polyesters and aluminium.

The adhesive of the present invention that comprises the epoxy resin composition as the main ingredient thereof is characterized by having an adhesive capability favorable for various film materials and, in addition thereto, having a high gas barrier property, and therefore, one layer of the adhesive can exhibit both a gas barrier property and an adhesive capability. As a result, using the adhesive for lamination of the present invention makes it possible to form a laminate film for wrapping materials having a high gas barrier property not requiring any additional gas barrier layer, though a conventional laminate film for wrapping materials requires a gas barrier function-having layer and an additional adhesive layer to be provided for the purpose of adhering the gas barrier layer and a sealant layer. In addition, the adhesive of the present invention can be used as an adhesive layer for adhesion of a sealant layer to a conventional gas barrier film of a PVDC coat layer, a PVA coat layer, an EVOH film layer, a metaxylyleneadipamide film layer, an inorganic substance-deposited film layer with alumina ($Al_2O_3$), silica (Si) or the like deposited thereon, etc. In this case, the adhesive of the present invention can greatly enhance the gas barrier property of the film.

In addition, the laminate film produced by the use of the adhesive for lamination of the present invention, and the wrapping materials, such as the wrapping bag produced by using the laminate film and by working it into a bag are excellent in gas barrier properties against oxygen, water vapor and others and excellent in the laminate strength, the heat seal strength, and others, and have predetermined strength in point of mechanical, chemical and physical strength, and are excellent in, for example, heat resistance, water resistance, aroma retentiveness, light fastness, chemical resistance, piercing resistance and other fastness properties; and consequently, the present invention provides wrapping materials capable of fully protecting contents and others to be charged and wrapped therein, for example, confectionery, staples, agricultural products, livestock products, marine products, fruits, vegetables, cooked foods, such as frozen prepared foods, chilled prepared foods, etc., milk products, liquid seasonings and others, as well as cosmetics, drugs and others, and the wrapping materials thus provided by the present invention are excellent in the storability of the contents therein, the storage stability and the capability of charging and wrapping the contents therein, etc.

MODE FOR CARRYING OUT THE INVENTION

The epoxy resin composition of the present invention is favorably used as the main ingredient of an adhesive for lamination for various types of vapor-permeable substrates, for example, for plastic films of polyolefin, polyester, polyamide or the like for use for wrapping materials for foods, drugs and others, and can be applied to plastic containers or the like as well as to other various materials to be coated, such as metal, concrete or the like for which conventional epoxy resin compositions are used. As containing the above-mentioned epoxy resin curing agent, the cured epoxy resin composition to form an adhesive layer can contain an amide group having a high cohesion force, therefore realizing a better gas barrier property and a higher adhesive strength to substrates, such as metals, concrete, plastics, etc. In the present invention, "the main ingredient" means that the composition can contain any other ingredient within a range not overstepping the spirit and the scope of the present invention, and preferably means that the ingredient accounts for at least 50% by weight of the entire composition, more preferably at least 70% by weight, even more preferably at least 90% by mass.

[Epoxy Resin Curing Agent]

The epoxy resin curing agent, and the epoxy resin composition containing the curing agent and an epoxy resin of the present invention are described below.

The epoxy resin curing agent of the present invention is a reaction product of the following (A), (B) and (C):

(A) meta-xylylenediamine or para-xylylenediamine,
(B) a polyfunctional compound having one acyl group and capable of forming an amide group moiety through reaction with a polyamine and forming an oligomer,
(C) a metal (meth)acrylate salt with a divalent or more polyvalent metal.

(A) is preferably meta-xylylenediamine or para-xylylenediamine, from the viewpoint of the gas barrier property of the composition, more preferably meta-xylylenediamine. The compound may be used here either singly or as a mixture thereof.

The polyfunctional compound (B) is a polyfunctional compound having one acyl group and capable of forming an amide group moiety through reaction with a polyamine and forming an oligomer. The polyfunctional compound (B) includes carboxylic acids, such as acrylic acid, methacrylic acid, cinnamic acid, crotonic acid and the like, and their derivatives, such as esters, amides, acid anhydrides, acid chlorides, etc. From the viewpoint of the reactivity thereof with amine and the gas barrier property of the composition, especially preferred are acrylic acid, methacrylic acid and the above-mentioned derivatives thereof that have a carbon-carbon double bond conjugate to the acyl group therein but do not have a substituent at the β-position therein.

One alone or two or more different types of the polyfunctional compounds of (B) may be used here either singly or as combined.

The metal for use in the (meth)acylate salt with a divalent or more polyvalent metal (above (C)) includes divalent or more polyvalent metals, such as zinc, aluminium, magnesium, calcium, tin, copper, nickel, palladium, iron, chromium, molybdenum, titanium, rubidium, cesium, strontium, barium, zirconium, hafnium, manganese, etc. In particular, from the viewpoint of easy industrial availability, preferred are zinc, magnesium and calcium. One alone or two or more different types of the salts (C) may be used here either singly or as combined. In producing the epoxy resin curing agent of the present invention, the metal (meth)acrylate salt with a divalent or more polyvalent metal of the component (C) may be used here as a powder, but is preferably used as an aqueous solution thereof. Using an aqueous solution of a metal (meth) acrylate salt provides an epoxy resin curing agent capable of giving a laminate film having a smaller haze than using a powdery metal (meth)acrylate salt.

In the present specification, "acrylic acid" and "methacrylic acid" may be collectively referred to as (meth) acrylic acid.

The reaction of the above-mentioned (A), (B) and (C) is described. In case where a carboxylic acid or a derivative thereof, such as an ester, an amide or the like is used as (B), first, preferably under the condition at from 0 to 100° C., more preferably at from 0 to 70° C., (A), (B) and (C) are mixed, and then reacted for amidation through dehydration, dealcoholation and deamination under the condition at from 100 to 300° C., preferably at from 120 to 250° C.

The mixing order may be an arbitrary one; however, from the viewpoint of the reactivity with the metal (C), preferably, (A) and (C) are first reacted, and then with (B) in a mode of addition reaction.

In this case, if desired, the pressure inside the reactor may be reduced in the final stage of the reaction for the purpose of completing the amidation. Also if desired, the system may be diluted with a nonreactive solvent. Further, a catalyst, such as a phosphite ester or the like may be added, serving as a dehydrating agent or a dealcoholizing agent.

On the other hand, in case where an acid anhydride or an acid chloride is used as (B) the components are mixed under the condition of from 0 to 150° C., preferably from 0 to 100° C. for amidation.

In this case, if desired, the pressure inside the reactor may be reduced in the final stage of the reaction for the purpose of completing the amidation. Also if desired, the system may be diluted with a nonreactive solvent. Further, a tertiary amine, such as pyridine, picoline, lutidine, trialkylamine or the like may be added.

The amide group moiety to be introduced through the above-mentioned reaction has a high cohesion force, and the presence of the amide group moiety in the epoxy resin curing agent at a high rate realizes a higher oxygen barrier property and a higher adhesive strength to substrates, such as metals, concrete, plastics, etc.

The reaction ratio of (B) to (A) is preferably within a range of from 0.3 to 0.95 as a molar ratio thereof ((B)/(A)), more preferably within a range of from 0.5 to 0.9, even more preferably within a range of from 0.6 to 0.8. The ratio falling within the range gives an amide group in a sufficient amount in the epoxy resin curing agent and secures the amount of the amino group necessary for reaction with epoxy group, therefore providing an epoxy resin curing agent capable of realizing a high gas barrier property and an excellent coating film performance and having good workability.

The reaction ratio of (C) to (A) is preferably within a range of from 0.05 to 0.35 as a molar ratio thereof ((C)/(A)), more preferably within a range of from 0.15 to 0.30, even more preferably within a range of from 0.15 to 0.25. The molar ratio of at least 0.05 realizes good adhesiveness, and the molar ratio of at most 0.35 realizes good workability. The reaction ratio of (B) and (C) to (A) is preferably within a range of from 0.4 to 0.97 as a molar ratio thereof (((B)+(C))/(A)). The molar ratio of at least 0.4 provides a sufficient amount of an amide group in the epoxy resin curing agent, therefore expressing a high-level gas barrier property and adhesiveness. In addition, the proportion of the volatile molecules remaining in the epoxy resin curing agent can be kept suitably and the cured product to be obtained does not generate an odor. Further, the proportion of the hydroxyl group to be formed through the reaction between the epoxy group and the amino group in the cured product is also good, therefore securing a good oxygen gas barrier property of the cured product in high-humidity environments. On the other hand, when the ratio is at most 0.97, then the amount of the amino group to react with epoxy resin is good therefore expressing excellent impact resistance and heat resistance, and in addition, the solubility of the composition in various types of organic solvents or water is also good. From the above, in case where the cured product to be obtained is considered to have especially a high gas barrier property, high adhesiveness, resistance to odor generation and a high oxygen barrier property in high-humidity environments, more preferably, the molar ratio of the polyfunctional compound to the polyamine component (((B)+(C))/(A)) falls within a range of from 0.6 to 0.97.

[Epoxy Resin Composition]

The epoxy resin composition of the present invention contains an epoxy resin and the above-mentioned epoxy resin curing agent. The epoxy resin composition of the present invention preferably has an oxygen barrier property of such that the oxygen transmission coefficient of the cured product obtained by curing the composition is at most 2.0 ml·mm/m$^2$·day·MPa (23° C., 60% RH), more preferably at most 1.5 ml·mm/m$^2$·day·MPa (23° C., 60% RH), even more preferably at most 1.0 ml·mm/m$^2$·day·MPa (23° C., 60% RH). The oxygen transmission coefficient may be determined according to the method to be mentioned below.

The epoxy resin to be contained in the epoxy resin composition of the present invention may be any of a saturated or unsaturated aliphatic compound, an alicyclic compound, an aromatic compound, or a heterocyclic compound; however, in consideration of high gas barrier property expression, preferred is an epoxy resin containing an aromatic ring in the molecule thereof.

As specific examples, there is mentioned at least one resin selected from an epoxy resin having a glycidylamino group derived from meta-xylylenediamine, an epoxy resin having a glycidylamino group derived from 1,3-bis(aminomethyl)cyclohexane, an epoxy resin having a glycidylamino group derived from diaminodiphenylmethane, an epoxy resin having a glycidylamino group and/or a glycidyloxy group derived from para-aminophenol, an epoxy resin having a glycidyloxy group derived from bisphenol A, an epoxy resin having a glycidyloxy group derived from bisphenol F, an epoxy resin having a glycidyloxy group derived from phenol-novolak, and an epoxy resin having a glycidyloxy group derived from resorcinol. Of those, from the viewpoint of the gas barrier property of the composition, especially preferred is an epoxy resin having a glycidylamino group derived from meta-xylylenediamine.

For the purpose of enhancing various properties, such as flexibility, impact resistance, wet heat resistance and the like of the composition, different types of epoxy resins mentioned above may be mixed in a suitable proportion for use herein.

The epoxy resins can be obtained through reaction of various types of alcohols, phenols and amines with epihalohydrins. For example, the epoxy resin having a glycidylamino group derived from meta-xylylenediamine can be obtained by adding epichlorohydrin to meta-xylylenediamine. Meta-xylylenediamine has four amino-hydrogen atoms, therefore producing mono-, di-, tri- and tetra-glycidyl compounds. The number of the glycidyl groups may be varied by varying the reaction ratio between meta-xylylenediamine and epichlorohydrin. For example, addition reaction of meta-xylylenediamine to epichlorohydrin in a ratio of about 4 molar times the latter essentially gives an epoxy resin having four glycidyl groups.

The epoxy resins can be produced by reacting various types of alcohols, phenols and amines with an excessive epihalohydrin in the presence of an alkali, such as sodium hydroxide or the like under the temperature condition of from 20 to 140° C., but preferably in a case of alcohols and phenols, from 50 to 120° C. and in a case of amines, from 20 to 70° C., followed by separating the formed alkali halide.

The number-average molecular weight of the formed epoxy resin varies depending on the molar ratio of the epihalohydrin to the alcohols, phenols and amines, but is preferably from about 80 to 4000, more preferably from about 200 to 1000, even more preferably from about 200 to 500.

As the epoxy resin curing agent for the composition of the present invention, those mentioned in the above may be used. However, in the epoxy resin composition of the present invention, if desired, any other epoxy resin curing agent may also be used within a range not overstepping the scope and the spirit of the present invention. The other epoxy resin curing agent may be any of aliphatic compounds, alicyclic compounds, aromatic compounds, or heterocyclic compounds, or that is, may be any epoxy resin curing agent generally usable in the art, including polyamines, phenols, acid anhydrides, carboxylic acids, etc. These epoxy resin curing agents may be suitably selected in accordance with the use of laminate films and with the necessary properties for the use.

The epoxy resin composition may be cured at concentration of the composition and at a temperature enough to give the cured reaction product, and the reaction condition may vary depending on the selection of the starting materials. Specifically, the concentration of the composition may vary, depending on the type of the selected materials and the molar ratio thereof, so as to cover a broad range of from a case not using a solvent to a case using a suitable type of organic solvents and/or water to have a composition concentration of about 5% by weight or so. Similarly, the curing reaction temperature may vary within a range of from room temperature to about 140° C.

Suitable organic solvents include glycol ethers, such as 2-methoxyethanol, 2-ethoxyethanol, 2-propoxyethanol, 2-butoxyethanol, 1-methoxy-2-propanol, 1-ethoxy-2-propanol, 1-propoxy-2-propanol etc.; alcohols, such as methanol, ethanol, 1-propanol, 2-propanol, 1-butanol, 2-butanol, etc.; aprotic polar solvents, such as N,N-dimethylformamide, N,N-dimethylacetamide, dimethyl sulfoxide, N-methylpyrrolidone, etc.; water-insoluble solvents, such as toluene, xylene, ethyl acetate, etc. From the viewpoint of the solubility of the epoxy resin curing agents therein, more preferred are water-soluble solvents, such as glycol ethers, alcohols, etc.

The blend ratio of the epoxy resin curing agent of the present invention to the epoxy resin in the epoxy resin composition of the present invention may be generally within a standard blend ratio range in the case of producing an epoxy resin reaction product through reaction of an epoxy resin and the epoxy resin curing agent of the present invention. Concretely, the ratio of the active amine hydrogen number in the epoxy resin curing agent of the present invention to the number of the epoxy groups in the epoxy resin (active amine hydrogen number in the epoxy resin curing agent of the present invention/number of the epoxy groups in the epoxy resin) falls within a range of from 1.0 to 1000, preferably from 1.0 to 20.0.

If desired, a thermoplastic resin, such as a polyurethane resin, a polyacrylic resin, a polyurea resin or the like may be mixed in the epoxy resin composition of the present invention within a range not detracting from the advantage of the present invention.

In case where the epoxy resin composition of the present invention is applied to an ordinary substrate, such as metals, concrete, plastics or the like, a defoaming agent or a wetting agent that comprises a silicon-containing or acrylic compound may be added to the gas-barrier epoxy resin composition of the present invention, for the purpose of assisting the removal of foams that may generate in stirring and mixing the composition or in coating with the composition or for the purpose of promoting the wettability of the surface of various substrates.

Suitable defoaming agents include BYK019, BYK052, BYK065, BYK066N, BYK067N, BYK070, BYK080 (all available from BYK-Chemie), etc.; and especially preferred is BYK065.

Suitable wetting agents include BYK331, BYK333, BYK340, BYK344, BYK347, BYK348, BYK378, BYK381

(all available from BYK-Chemie), etc. In case where these are added, the amount thereof is preferably within a range of from 0.01 to 2.0% by weight based on the total weight of the cured product.

For enhancing the properties, such as the impact resistance of the cured product, an inorganic filler may be added to the epoxy resin composition, such as silica, alumna, mica, talc, aluminium flakes, glass flakes, etc. In case where these are added, the amount thereof is preferably within a range of from 0.01% by weight to 10.0% by weight based on the total weight of the epoxy resin composition.

Further, for enhancing the adhesiveness of the epoxy resin cured product layer to various materials, a coupling agent may be added to the epoxy resin composition, for example, a silane coupling agent, a titanium coupling agent, etc.

As the coupling agent, any commercially-available one is usable here. Above all, preferred are amino-containing silane coupling agents, such as N-(2-aminoethyl)-3-aminopropyl-methyldimethoxysilane, N-(2-aminoethyl)-3-aminopropyltrimethoxysilane, 3-aminopropyltriethoxysilane, 3-aminopropyltrimethoxysilane, N,N-bis[3-trimethoxysilyl]propylethylenediamine, etc.; epoxy-containing silane coupling agents, such as 3-glycidoxypropyltrimethoxysilane, 3-glycidoxypropylmethyldimethoxysilane, 2-(3,4-epoxycyclohexyl)ethyltrimethoxysilane, 3-glycidoxypropyltriethoxysilane, etc.; methacryloxy-containing silane coupling agents, such as 3-metacryloxypropyltrimethoxysilane, etc.; mercapto-containing silane coupling agents, such as 3-mercaptopropyltrimethoxysilane, etc.; isocyanate-containing silane coupling agents, such as 3-isocyanatepropyltrimethoxysilane, as available from Chisso, Toray Dow Corning, Shin-Etsu Chemical and others, aminosilane coupling agents, such as Toray Dow Corning's SH-6026, Z-6050, etc.; and amino group-containing alkoxysilanes, such as Shin-Etsu Chemical's KP-390, KC-223, etc., which have an organic functional group capable of reacting with the gas-barrier resin composition of the present invention.

In case where these are added to the composition, the amount thereof is preferably within a range of from 0.01 to 10.0% by weight based on the total weight of the epoxy resin composition. In case where the substrate is a film coated with an inorganic compound, such as silica, alumina or the like through vapor deposition thereon, more preferred is a silane coupling agent.

[Adhesive for Lamination]

The adhesive for lamination of the present invention comprises the above-mentioned epoxy resin composition of the present invention as the main ingredient thereof. If desired, a tackifier, such as xylene resin, terpene resin, phenolic resin, rosin resin or the like may be added to the adhesive for lamination of the present invention for the purpose of enhancing the adhesiveness of the agent to various film materials immediately after application thereof to various film materials. In case where such a tackifier is added, the amount thereof is preferably within a range of from 0.01 to 5.0% by weight based on the total weight of the adhesive composition to constitute the adhesive.

Also if desired, a necessary amount of various components, such as those exemplified below may be added to the adhesive for lamination of the present invention. Examples thereof include, for the purpose of enhancing the low-temperature curability of the adhesive, a curing promoter, such as a boron trifluorides amine complex, e.g., boron trifluoride monoethylamine complex, and a boron trifluoride ether complex, e.g., boron trifluoride dimethyl ether complex, boron trifluoride diethyl ether complex and boron trifluoride di-n-butyl ether complex, an imidazole, such as 2-phenylimidazole, benzoic acid, salicylic acid, N-ethylmorpholine, dibutyltin dilaurate, cobalt naphthenates, and stannous chloride, an organic solvent, such as benzyl alcohol, a rust inhibitor additive, such as zinc phosphate, iron phosphate, calcium molybdate, vanadium oxide, water-dispersed silica, fumed silica, etc., an organic pigment, such as phthalocyanine-type organic pigment, condensed ring-type polycyclic organic pigment, etc., and an inorganic pigment, such as titanium oxide, zinc oxide, calcium carbonate, barium sulfate, alumina, carbon black, etc.

Also if desired, a compound having an oxygen-trapping function may be added to the adhesive for lamination of the present invention. The compound having an oxygen-trapping function includes, for example, low-molecular organic compounds capable of reacting with oxygen, such as hindered phenols, vitamin C, vitamin E, organic phosphorus compounds, gallic acid, pyrogallol, etc., and transition metal compounds with cobalt, manganese, nickel, iron, copper or the like.

[Laminate Film]

The laminate film of the present invention is produced by the use of the above-mentioned adhesive for lamination of the present invention.

The film material to be formed into laminates by the use of the adhesive for lamination of the present invention includes, for example, polyolefin films of low-density polyethylene, high-density polyethylene, linear low-density polyethylene, polypropylene, etc.; polyester films of polyethylene terephthalate, polybutylene terephthalate, etc.; polyamide films of nylon 6, nylon 6,6, metaxyleneadipamide (N-MXD6), etc.; biodegradable films of polylactic acid, etc.; polyacrylonitrile films, poly(meth)acrylic films, polystyrene films, polycarbonate films, saponified ethylene-vinyl acetate copolymer (EVOH) films, polyvinyl alcohol films; papers, such as carton, etc.; metal foils of aluminium, copper, etc.; films produced by coating those materials with various polymers, such as polyvinylidene chloride (PVDC) resin, polyvinyl alcohol resin, saponified ethylene-vinyl acetate copolymer resin, acrylic resin, etc.; films coated with various inorganic compounds or metals, such as silica, alumina, aluminium or the like through vapor deposition; films with an inorganic filler dispersed therein; films given an oxygen-trapping function, etc. An inorganic filler may be dispersed in those various polymers with which the substrate films are to be coated. The inorganic filler includes silica, alumina, mica, talc, aluminium flakes, glass flakes, etc.; however, preferred are layered silicates, such as montmorillonite, etc. As the method for dispersing them, any conventional known method is employable, such as an extrusion kneading method, a mixing dispersion method in a resin solution, etc. As the method of giving an oxygen-trapping function, for example, herein employable is a method of using, as at least a part of the composition, a compound that contains a low-molecular organic compound capable of reacting with oxygen, such as a hindered phenol compound, vitamin C, vitamin E, an organic phosphorus compound, gallic acid, pyrogallol or the like, as well as a transition metal compound with cobalt, manganese, nickel, iron, copper or the like.

The thickness of the film material may be from 10 to 300 μm or so, preferably from 10 to 100 μm or so for practical use of the film. In case of a plastic film, the film may be stretched monoaxially or biaxially.

Optionally but preferably, the surface of the film material may be surface-treated in various modes of flame treatment, corona discharge treatment or the like for the purpose of forming thereon a good adhesive film with no coating or crawling failures. The treatment promotes good adhesion of the adhesive layer to various film materials.

If desired, after the surface of the film material has been surface-treated suitably, a printing layer may be provided thereon. In case of forming a printing layer, an ordinary printing apparatus heretofore generally used for printing on polymer films, such as a gravure printer, a flexographic printer, an offset printer or the like may be used also in the case of the present invention in the same manner as usual. The ink for forming the printing layer may also be an ordinary ink heretofore generally used for the printing layer to be formed on ordinary polymer films, which may comprise an azo-type, phthalocyanine-type or the like pigment, a rosin, a polyamide, a polyurethane or the like resin, and a solvent, such as methanol, ethyl acetate, methyl ethyl ketone, etc.

Of those film materials, preferably selected are polyolefin films, such as polyethylene film, polypropylene film, ethylene-vinyl acetate copolymer film or the like for a flexible polymer film layer to be a sealant layer, in consideration of the capability thereof to express good heat sealability. The thickness of the film may be from 10 to 300 μm or so, preferably from 10 to 100 μm or so for practical use. If desired, the film surface may be processed for various surface treatments of flame treatment, corona discharge treatment, etc.

In the present invention, a primer (medium) layer may be formed on the adhesive-coating surface. In this case, so far as having adhesiveness to substrates, primers having various chemical structures may be used both for one-component and two-component primers. Preferred is a polyester-type primer, into which an alcohol, such as methanol favorably used as the main solvent for adhesives poorly permeates, for practical use. The thickness of the primer layer is preferably from 0.01 to 20 μm from the viewpoint of securing sufficient adhesiveness and uniform thickness thereof, more preferably from 0.1 to 5 μm for practical use.

The laminate film is produced by laminating an outer layer of a thermoplastic resin or a heat-sealable thermoplastic resin layer. In laminating the constituent layers to form the laminate film, at least one adhesive layer is formed of an adhesive that comprises, as the main ingredient thereof, the epoxy resin composition of the present invention that includes an epoxy resin and the epoxy resin curing agent of the present invention. For the other adhesive layer than the adhesive layer that uses the adhesive of the present invention, any other adhesive, such as polyurethane adhesive or the like may be used, and if desired, resins may be fused together.

The laminate film may contain at least one barrier layer formed of a cured product of the adhesive that comprises, as the main ingredient thereof, the above-mentioned epoxy resin composition of the present invention. With respect to the other layers, the aforementioned various materials can be selected. For example, there may be mentioned a three-layer configuration of polyolefin/epoxy resin cured product/polyolefin, in which the epoxy resin cured product serves as an adhesive layer. However, the present invention is not limited thereto.

In case where various film materials are laminated by the use of the adhesive that comprises the epoxy resin composition as the main ingredient thereof, employable here are various known lamination methods of dry lamination, non-solvent lamination, extrusion lamination or the like; however, in the present invention, from the viewpoint of the viscosity of the curing agent, preferred is dry lamination.

In case where the adhesive is applied to various materials for lamination thereon, the epoxy resin composition shall have a concentration at a temperature enough to give a cured epoxy resin product to be the adhesive layer, and the concentration and the temperature may be varied depending on the starting materials and the lamination method selected for the lamination. Specifically, depending on the type of the selected material, the selected molar ratio and the selected lamination method, the concentration of the epoxy resin composition may vary in a broad range that covers various types of from a case of not using a solvent to a case of using a suitable type of an organic solvent and/or water so as to dilute the composition to have a concentration of about 5% by weight or so in preparing coating liquid.

For the organic solvent, any type of solvent capable of dissolving the adhesive can be used here. For example, the solvent includes water-insoluble solvents, such as toluene, xylene, methyl acetate, ethyl acetate, butyl acetate, acetone, methyl ethyl ketone, etc.; glycol ethers, such as 2-methoxyethanol, 2-ethoxyethnaol, 2-propoxyethanol, 2-butoxyethanol, 1-methoxy-2-propanol, 1-ethoxy-2-propanol, 1-propoxy-2-propanol, etc.; alcohols, such as methanol, ethanol, 1-propanol, 2-propanol, 1-butanol, 2-butanol, etc.; aprotic polar solvents, such as N,N-dimethylformamide, N,N-dimethylacetamide, dimethyl sulfoxide, N-methylpyrrolidone, etc.

The adhesive (coating liquid) diluted with a solvent may have a concentration of such that the Zahn cup (No. 3) viscosity thereof could fall within a range of from 5 to 30 seconds (25° C.). When the Zahn cup (No. 3) viscosity thereof is at least 5 seconds, the adhesive could be fully applied to the subject to be coated therewith, not causing any roll staining thereon. When the Zahn cup (No. 3) viscosity thereof is at most 30 seconds, then the adhesive could fully move to the coating roll to readily form a uniform adhesive layer. For example, in dry lamination, the Zahn cup (No. 3) viscosity of the adhesive is preferably from 10 to 20 seconds (25° C.) during use thereof.

In case where a solvent is used, the solvent drying temperature after application of the adhesive may vary in a broad range of from 20° C. to 140° C., but is preferably close to the boiling point of the solvent and has little influence on the coated subject. When the drying temperature is lower than 20° C., then the solvent may remain in the laminate film to cause adhesion failure or odor. When the drying temperature is higher than 140° C., then the polymer film may soften and a laminate film with good appearance would be difficult to produce. For example, in case where the adhesive is applied to a stretched polypropylene film, the temperature is preferably from 40 to 120° C.

Regarding the coating mode for applying the adhesive, herein employable is any ordinary coating mode of roll coating, spray coating, air knife coating, dipping, brushing or the like, but preferred is roll coating or spray coating. For example, the same roll coating or spraying technique and equipment as those in the case of applying a polyurethane adhesive component to a polymer film for lamination may be applicable to the present invention.

Next described are concrete operations in various lamination methods. In the case of a dry lamination method, the coating liquid is applied to a film material including a substrate with a roll, such as a gravure roll or the like, then the solvent is dried away and thereafter immediately another film material is stuck to the coated surface with nip rolls to give a laminate film.

The solvent for use in preparing the adhesive is preferably a solvent including an alcohol with at most 3 carbon atoms, having a good ability to dissolve the adhesive component and having a relatively low boiling point. As an example thereof, there may be mentioned a solvent comprising, as the main ingredient thereof, at least one or more selected from a group consisting of methanol, ethanol, isopropanol, and n-propanol. Preferably, the solvent is a mixture liquid mixed with a solvent having a functional group of any of an ester group, a ketone group and an aldehyde group having the ability to retard the reaction between an epoxy resin and a polyamine and to prevent the viscosity of the adhesive from increasing thereby prolonging the operation time. As an example of the mixture liquid mixed with a solvent having a functional group of any of an ester group, a ketone group and an aldehyde group, there may be mentioned a mixture liquid mixed with at least one selected from a group consisting of methyl acetate, ethyl acetate, acetone, methyl ethyl ketone, acetaldehyde or propionaldehyde having a relatively low boiling point.

For obtaining a laminate film in which the amount of the solvent remaining therein is small, preferably, the content of the solvent having a functional group of any of an ester group, a ketone group or an aldehyde group is at most 20% by weight of the entire solvent. In case where the amount of the solvent remaining in the laminate film is large, then the solvent would cause an offensive odor, and therefore the remaining solvent amount is practically at most 7 mg/m$^2$. When the amount is more than 7 mg/m$^2$, the film may emit an offensive odor. For strict control of odor emission from the film, the amount is preferably at most 5 mg/m$^2$, more preferably at most 3 mg/m$^2$.

In the dry lamination method, the adhesive may be applied onto the sealant layer, or may be applied onto a polyolefin film, such as a polyethylene film, a polypropylene film, an ethylene-vinyl acetate copolymer film or the like, and then after dried, a substrate of a stretched polypropylene, polyamide, polyethylene terephthalate film or the like may be stuck thereto to give a laminate film.

In case of lamination with nip rolls, the nip rolls may be heated at 20 to 120° C. for use for sticking, but are preferably heated at 40 to 100° C.

In this case, after lamination, the film is preferably aged at 20 to 60° C. for a given period of time to complete the curing reaction. Aging for a given period of time enables formation of a cured epoxy resin product at a sufficient reaction rate thereby expressing a good gas barrier property. In aging at a temperature lower than 20° C. or in the absence of aging, the reaction rate of the epoxy resin composition is low, therefore often failing to attain a good gas barrier property and good adhesiveness. Aging at a temperature higher than 60° C. may bring about a problem of polymer film blocking or additive dissolution.

In the non-solvent lamination method, the above-mentioned adhesive is previously heated at from 40 to 100° C. or so, and is applied to a film material including a substrate, using a roll, such as a gravure roll or the like heated at from 40 to 120° C., and then immediately another film material is stuck to the surface of the adhesive to give a laminate film. Also in this case, if desired, the laminate film is preferably aged for a given period of time, like in the dry lamination method.

In the extrusion lamination method, the epoxy resin and the epoxy resin curing agent that are the main ingredients of the adhesive are diluted with an organic solvent and/or water to give a diluted solution that serves as an adhesion promoter (anchor coat agent), and this is applied to a film material including a substrate, using a roll, such as a gravure roll or the like, then dried at 20 to 140° C. for solvent removal and curing reaction, and thereafter a polymer material melted through an extruder is laminated thereon to give a laminate film. The polymer material to be melted for extrusion is preferably a polyolefin resin, such as a low-density polyethylene resin, a linear low-density polyethylene resin, an ethylene-vinyl acetate copolymer resin, etc.

The lamination methods and any other ordinary lamination methods may be optionally combined here, and the layer configuration of the laminate film to be produced here varies depending on the use and the shape thereof.

The thickness of the adhesive layer formed by applying the adhesive to various materials followed by drying, lamination and heat treatment may be from 0.1 to 100 μm but is preferably from 0.5 to 10 μm for practical use. The thickness of at least 0.1 μm realizes a sufficient gas barrier property and good adhesiveness; and the thickness of at most 100 μm facilitates formation of the adhesive layer having a uniform thickness.

The laminate film of the present invention has an excellent lamination strength. Though varying depending on the material of the substrate and that of the sealant layer, the lamination strength at a peeling speed of 300 mm/min after heat treatment is preferably at least 80 g/15 mm, more preferably at least 100 g/15 mm, even more preferably from 120 g/15 mm, in a case where the substrate is a stretched polypropylene film. On the other hand, in a case where the substrate is a stretched nylon or polyethylene terephthalate film and where the sealant layer is formed of a low-density polyethylene or unstretched polypropylene film, the peeling speed is preferably at least 150 g/15 mm, more preferably at least 200 g/15 mm, even more preferably at least 300 g/15 mm. The lamination strength may be determined according to the method to be mentioned hereinunder.

[Multilayer Wrapping Material and Wrapping Bag]

The laminate film produced by the use of the adhesive for lamination of the present invention can be used as a multilayer wrapping material for protecting foods, drugs, etc. Specifically, the multilayer wrapping material of the present invention contains at least one unit of the laminate film of the present invention. "One unit" as referred to herein is meant to indicate three layers of the adhesive layer of the present invention and the two layers both adjacent to the adhesive layer. In case where the laminate film is used as a multilayer wrapping material, the layer configuration thereof varies depending on the content to be wrapped with the material and on the usage environment and the usage pattern thereof. Specifically, the laminate film of the present invention may be used as a multilayer wrapping material directly as it is, or if desired, an oxygen absorbing layer, a thermoplastic resin film layer, a paper layer, a metal foil layer or the like may be further laminate on the laminate film of the present invention. In this case, the adhesive for lamination of the present invention may be used for laminating them, or any other adhesive or anchor coat agent may be used for the lamination.

The wrapping bag, such as a soft wrapping bag or the like to be formed of the multilayer wrapping material is described. The wrapping bag, such as a soft wrapping bag or the like may be formed of the multilayer wrapping material of the present invention. In case where the multilayer wrapping material has a heat-sealable resin layer, one material is put on another in such a manner that the heat-sealable resin layer side of the two could face each other, and thereafter the peripheral edge of the thus-arranged sides is heat-sealed to form a sealed edge, thereby giving a wrapping bag. The bag production method is described. For example, the multilayer wrapping material is folded or one material is put on another in such a manner that the inner layer side of the two could face each other, and further, the peripheral edge of the thus-arranged sides is heat-sealed in a mode of side sealing, two-direction sealing, three-direction sealing, four-direction sealing, envelop-type sealing, butt-sealing (pillow sealing), ribbed sealing, flat bottom sealing, square bottom sealing, gazette sealing, and any other various sealing modes. The wrapping bag may have various different types of forms depending on the content to be wrapped in the bag and on the usage environment and the usage pattern thereof. In addition, for example, a self-standing wrapping bag (standing pouch) and others are employable here. Regarding the heat-sealing method, for example, any known methods are employable here, a bar sealing method, a rotary roll sealing method, a belt sealing method, an impulse sealing method, a high frequency sealing method, an ultrasonic sealing method, etc.

A content is charged in the wrapping bag through its opening, and then the opening is heat-sealed to produce a bagged product using the wrapping bag of the present invention. As the contents to be charged in the bag, there may be mentioned various foods including confectionery, such as rice confectionery, sweets with beans, nuts, biscuits, cookies, wafers confectionary, marshmallows, pies, semiperishable sweets, candies, snack foods, etc.; staples, such as bread, snack noodles, instant noodles, dry noodles, pastas, aseptic packaged rice, porridges of rice and vegetables, rice-gruel, packaged rice cakes, cereal foods, etc.; agricultural processed foods, such as pickles, boiled beans, natto (fermented soybeans), miso (soybean paste), shimi-dofu (frozen dried spongy tofu), tofu (bean-curd cake), enokidake mushrooms, jonjac (devil's tongue), processed mountain vegetables, jams, peanut cream, salads, frozen vegetables, processed potato products, etc.; processed livestock products, such as hams, bacons, sausages, processed chicken products, canned beefs, etc.; processed marine products, such as fish hams/sausages, marine paste products, kamaboko (minced fleshes), seaweeds, fish foods boiled in soy sauce, dried bonitos, salted fish guts, smoked salmons, karashi-mentaiko (food made of salted cod roe with red pepper), etc.; fruits, such as peaches, oranges, pineapples, apples, pears, cherries, etc.; vegetables, such as corns, asparagus, mushrooms, onions, carrots, Japanese white radishes, potatoes, etc.; cooked foods, for example, frozen everyday dishes or chilled every dishes typically, such as hamburgers, meat balls, fried marine products, gyozas (dumplings with minced pork and vegetable stuffing), croquettes, etc.; milk products, such as butter, margarine, cheese, cream, instant cream powder, conditioned milk powder for infant, liquid seasonings, retort curry, pet foods, etc. In addition, the wrapping material can also be used for tobaccos, disposable body warmers, drugs, cosmetics, etc.

EXAMPLES

Next, the present invention is described concretely with reference to Examples thereof. However, the present invention is not whatsoever limited by these Examples.

Epoxy resin curing agents A to E were produced according to the method mentioned below.

Epoxy Resin Curing Agent A

One mol of meta-xylylenediamine and 0.20 mol of zinc acrylate were put into a reactor. This was heated up to 60° C. in a nitrogen current atmosphere, and 0.70 mol of methyl acrylate was dropwise added thereto, taking 1 hour. While the formed methanol was evaporated away, the content was heated up to 165° C., and kept at 165° C. for 1.0 hour. Methanol in an amount corresponding to 65% of the solid concentration was dropwise added to this, taking 1.5 hours, thereby producing an epoxy resin curing agent A.

Epoxy Resin Curing Agent B

One mol of meta-xylylenediamine and 0.15 mol of zinc acrylate were put into a reactor. This was heated up to 60° C. in a nitrogen current atmosphere, and 0.78 mol of methyl acrylate was dropwise added thereto, taking 1 hour. While the formed methanol was evaporated away, the content was heated up to 165° C., and kept at 165° C. for 1.0 hour. Methanol in an amount corresponding to 65% of the solid concentration was dropwise added to this, taking 1.5 hours, thereby producing an epoxy resin curing agent B.

Epoxy Resin Curing Agent C

One mol of meta-xylylenediamine and 0.20 mol of magnesium acrylate were put into a reactor. This was heated up to 60° C. in a nitrogen current atmosphere, and 0.70 mol of methyl acrylate was dropwise added thereto, taking 1 hour. While the formed methanol was evaporated away, the content was heated up to 165° C., and kept at 165° C. for 1.0 hour. Methanol in an amount corresponding to 65% of the solid concentration was dropwise added to this, taking 1.5 hours, thereby producing an epoxy resin curing agent C.

Epoxy Resin Curing Agent D

One mol of meta-xylylenediamine and 0.20 mol of calcium acrylate were put into a reactor. This was heated up to 60° C. in a nitrogen current atmosphere, and 0.70 mol of methyl acrylate was dropwise added thereto, taking 1 hour. While the formed methanol was evaporated away, the content was heated up to 165° C., and kept at 165° C. for 1.0 hour. Methanol in an amount corresponding to 65% of the solid concentration was dropwise added to this, taking 1.5 hours, thereby producing an epoxy resin curing agent D.

Epoxy Resin Curing Agent E

One mol of meta-xylylenediamine was put in a reactor. 0.70 mol of methyl acrylate was dropwise added thereto in a nitrogen current atmosphere, taking 1 hour. Next, 143 g of an aqueous zinc acrylate solution containing 0.20 mol of zinc acrylate (concentration: 29%) was dropwise added thereto, taking 1 hour.

While water and the formed methanol were evaporated away, the content was heated up to 165° C., and kept at 165° C. for 1.0 hour. Methanol in an amount corresponding to 65% of the solid concentration was dropwise added to this, taking 1.5 hours, thereby producing an epoxy resin curing agent E.

Amine-Based Curing Agent F

One mol of meta-xylylenediamine was put in a reactor. 0.70 mol of methyl acrylate was dropwise added thereto in a nitrogen current atmosphere, taking 1 hour. Next, 107 g of an aqueous magnesium acrylate solution containing 0.20 mol of magnesium acrylate (concentration: 31%) was dropwise added thereto, taking 1 hour. While water and the formed methanol were evaporated away, the content was heated up to 165° C., and kept at 165° C. for 1.0 hour. Methanol in an amount corresponding to 65% of the solid concentration was dropwise added to this, taking 1.5 hours, thereby producing an epoxy resin curing agent F.

Epoxy Resin Curing Agent G

One mol of meta-xylylenediamine was put in a reactor. The temperature was raised to 60° C. in a nitrogen current atmosphere, 0.93 mol of methyl acrylate was dropwise added thereto taking 1 hour. While the formed methanol was evaporated away, the content was heated up to 165° C., and kept at 165° C. for 2.5 hours. Methanol in an amount corresponding to 65%; of the solid concentration was dropwise added to this, taking 1.5 hours, thereby producing an epoxy resin curing agent G.

Coating Solution A

A solution containing 436 parts by weight of the epoxy resin curing agent A, 50 parts by weight of an epoxy resin having a glycidylamino group derived from meta-xylylenediamine (Mitsubishi Gas Chemical's TETRAD-X) and 485 parts by weight of methanol was prepared, to which was added 0.1 parts by weight of a silicone-based defoaming agent (BYK-Chemie's BYK065) and well stirred to give a coating solution A (active amine hydrogen number in the curing agent A/number of the epoxy groups in the epoxy resin=3.5).

Coating Solution B

A solution containing 160 parts by weight of the epoxy resin curing agent B, 50 parts by weight of an epoxy resin having a glycidylamino group derived from meta-xylylenediamine (Mitsubishi Gas Chemical's TETRAD-X), 109 parts by weight of methanol and 19 parts by weight of water was prepared, to which was added 0.1 parts by weight of a silicone-based defoaming agent (BYK-Chemie's BYK065) and well stirred to give a coating solution B (active amine hydrogen number in the curing agent B/number of the epoxy groups in the epoxy resin=1.3).

Coating Solution C

A solution containing 625 parts by weight of the epoxy resin curing agent C, 50 parts by weight of an epoxy resin having a glycidylamino group derived from meta-xylylenediamine (Mitsubishi Gas Chemical's TETRAD-X) and 180 parts by weight of methanol was prepared, to which was added 0.1 parts by weight of a silicone-based defoaming agent (BYK-Chemie's BYK065) and well stirred to give a coating solution C (active amine hydrogen number in the curing agent C/number of the epoxy groups in the epoxy resin=3.5).

Coating Solution D

A solution containing 464 parts by weight of the epoxy resin curing agent D, 50 parts by weight of an epoxy resin having a glycidylamino group derived from meta-xylylenediamine (Mitsubishi Gas Chemical's TETRAD-X) and 250 parts by weight of methanol was prepared, to which was added 0.1 parts by weight of a silicone-based de foaming agent (BYK-Chemie's BYK065) and well stirred to give a coating solution D (active amine hydrogen number in the curing agent D/number of the epoxy groups in the epoxy resin=3.5).

Coating Solution E

A solution containing 831 parts by weight of the epoxy resin curing agent E, 68 parts by weight of an epoxy resin having a glycidylamino group derived from meta-xylylenediamine (Mitsubishi Gas Chemical's TETRAD-X) and 601 parts by weight of methanol was prepared, to which was added 0.1 parts by weight of a silicone-based defoaming agent (BYK-Chemie's BYK065) and well stirred to give a coating solution E (active amine hydrogen number in the curing agent E/number of the epoxy groups in the epoxy resin=5.8).

Coating Solution F

A solution containing 595 parts by weight of the epoxy resin curing agent F, 236 parts by weight of an epoxy resin having a glycidylamino group derived from meta-xylylenediamine (Mitsubishi Gas Chemical's TETRAD-X) and 668 parts by weight of methanol was prepared, to which was added 0.1 parts by weight of a silicone-based defoaming agent (BYK-Chemie's BYK065) and well stirred to give a coating solution F (active amine hydrogen number in the curing agent F/number of the epoxy groups in the epoxy resin=1.4).

Coating Solution G

A solution containing 160 parts by weight of the epoxy resin curing agent G, 50 parts by weight of an epoxy resin having a glycidylamino group derived from meta-xylylenediamine (Mitsubishi Gas Chemical's TETRAD-X), 201 parts by weight of methanol and 29 parts by weight of ethyl acetate was prepared, to which was added 0.1 parts by weight of a silicone-based defoaming agent (BYK-Chemie's BYK065) and well stirred to give a coating solution G (active amine hydrogen number in the curing agent G/number of the epoxy groups in the epoxy resin=1.4).

Evaluation methods for gas barrier property, lamination strength and others are mentioned below.

<Oxygen Transmission Coefficient (ml·mm/m$^2$·day·MPa)>

Using an oxygen transmission rate measurement system (Modern Control's OX-TRAN2/21), the coating solution (epoxy resin composition) was applied onto a substrate and a sealant film was stuck thereto to prepare a laminate film. The oxygen transmittance of the laminate film, that of the substrate and that of the sealant film were measured under the condition at 23° C. and a relative humidity of 60%, and the oxygen transmission coefficient of the coating film was calculated according to the following formula:

$$1/R_1 = 1/R_2 + DFT/P + 1/R_3,$$

wherein;

$R_1$=oxygen transmittance of the laminate film (ml/m$^2$·day·MPa), $R_2$=oxygen transmittance of the substrate (ml/m$^2$·day·MPa), $R_3$=oxygen transmittance of the sealant film (ml/m$^2$·day·MPa), DFT=thickness of the coating film (mm), P=oxygen transmission coefficient of the coating film.

<Lamination Strength (g/15 mm)>

According to the method indicated by JISK-6854, the lamination strength of the laminate film was measured with a T-type peeling tester at a peeling rate of 300 mm/min.

Example 1

Lamination Strength

An ethyl acetate solution containing, as a polyurethane adhesive therein, 50 parts by weight of a polyether component (Toyo Morton's TM-319) and 50 parts by weight of a polyisocyanate component (Toyo Morton's CAT-19B) (solid concentration, 30% by weight) was applied onto a biaxially-stretched nylon film (Toyobo's N1102) having a thickness of 15 μm, and dried at 85° C. for 10 seconds, and thereafter a stretched ester film (Toyobo's E5200) having a thickness of 12 μm was stuck thereto with nip rolls and aged at 40° C. for 2 days to give a laminate film. Using a bar coater No. 4, the coating solution A was applied onto the ester film of the obtained laminate film (coating amount: 10 g/m$^2$ (as solid content)), and dried at 85° C. for 10 seconds. Using nip rolls, a linear low-density polyethylene film (Tohcello's TUX-MCS) having a thickness of 40 μm was stuck thereto and aged at 40° C. for 2 days to give a laminate film. The lamination strength of the laminate film was measured. The result is shown in Table 1.

<Oxygen Transmission Coefficient>

Using a bar coater No. 4, the coating solution A was applied onto a biaxially-stretched polypropylene film (Toyobo's P2161) having a thickness of 20 μm (coating amount: 10 g/m$^2$ (as solid content)), and dried at 85° C. for 10 seconds. Subsequently, using nip rolls, a linear low-density polyethylene film (Tohcello's TUX-MCS) having a thickness of 40 μm was stuck thereto and aged at 40° C. for 2 days to give a laminate film. The oxygen transmission coefficient of the laminate film was determined. The result is shown in Table 1.

Example 2

A laminate film was produced according to the same method as in Example 1 except that the coating solution B was used in place of the coating solution A, and the lamination strength and the oxygen transmission coefficient thereof were determined in the same manner as in Example 1. The results are shown in Table 1.

Example 3

A laminate film was produced according to the same method as in Example 1 except that the coating solution C was used in place of the coating solution A, and the lamination strength and the oxygen transmission coefficient thereof were determined in the same manner as in Example 1. The results are shown in Table 1.

Example 4

A laminate film was produced according to the same method as in Example 1 except that the coating solution D was used in place of the coating solution A, and the lamination strength and the oxygen transmission coefficient thereof were determined in the same manner as in Example 1. The results are shown in Table 1.

Example 5

A laminate film was produced according to the same method as in Example 2 except that an aluminium foil (Toyo Aluminium's aluminium foil 1N30) having a thickness of 8 μm was used in place of the stretched ester film as the substrate for the laminate film, and the lamination strength and the oxygen transmission coefficient thereof were determined in the same manner as in Example 1. The results are shown in Table 1.

Example 6

A laminate film was produced according to the same method as in Example 1 except that the coating solution E was used in place of the coating solution A, and the lamination strength and the oxygen transmission coefficient thereof were determined in the same manner as in Example 1. The results are shown in Table 1.

Example 7

A laminate film was produced according to the same method as in Example 1 except that the coating solution F was used in place of the coating solution A and an aluminium foil (Toyo Aluminium's aluminium foil 1N30) having a thickness of 8 μm was used in place of the stretched ester film, and the lamination strength and the oxygen transmission coefficient thereof were determined in the same manner as in Example 1. The results are shown in Table 1.

Comparative Example 1

A laminate film was produced according to the same method as in Example 1 except that the coating solution G was used in place of the coating solution A, and the lamination strength and the oxygen transmission coefficient thereof were determined in the same manner as in Example 1. The results are shown in Table 1.

Comparative Example 2

A laminate film was produced according to the same method as in Comparative Example 1 except that an aluminium foil (Toyo Aluminium's aluminium foil 1N30) having a thickness of 8 μm was used in place of the stretched ester film as the substrate for the laminate film, and the lamination strength and the oxygen transmission coefficient thereof were determined in the same manner as in Example 1. The results are shown in Table 1.

TABLE 1

| | Oxygen Transmission Coefficient (ml · mm/m$^2$ · day · MPa) | Lamination Strength (g/15 mm) |
|---|---|---|
| Example 1 | 0.36 | 530 |
| Example 2 | 0.4 | 210 |
| Example 3 | 0.19 | 270 |
| Example 4 | 0.19 | 340 |
| Example 5 | 0.4 | 220 |
| Example 6 | 0.25 | 570 |
| Example 7 | 0.26 | 220 |
| Comparative Example 1 | 0.33 | 30 |
| Comparative Example 2 | 0.33 | 20 |

The invention claimed is:

1. A laminate film produced by the use of an adhesive for lamination comprising an epoxy resin composition as the main ingredient thereof,
   wherein the epoxy resin composition contains an epoxy resin and an epoxy resin curing agent, and
   wherein the epoxy resin curing agent comprises a reaction product of the following (A), (B) and (C):
   (A) meta-xylylenediamine or para-xylylenediamine,
   (B) a polyfunctional compound having one acyl group and capable of forming an amide group moiety through reaction with a polyamine and forming an oligomer,
   (C) a metal acrylate salt with a divalent metal,
   wherein a reaction molar ratio of (C) to (A) ((C)/(A)) is from 0.05 to 0.35; and
   a reaction molar ratio of (B) and (C) to (A) (((B)+(C))/(A)) is within a range of from 0.6 to 0.97;
   and wherein a lamination strength of the laminate film produced when using a stretched nylon film as the substrate and by using of the adhesive is at least 200 g/15 mm.

2. The laminate film according to claim 1, wherein (A) is meta-xylylenediamine.

3. The laminate film according to claim 1, wherein (B) is acrylic acid, methacrylic acid, or their ester, amide, acid anhydride or acid chloride.

4. The laminate film according to claim 1, wherein the ratio of the active amine hydrogen number in the epoxy resin curing agent to the number of the epoxy groups in the epoxy resin (active amine hydrogen number in the epoxy resin curing agent/number of the epoxy groups in the epoxy resin) falls within a range of from 1.0 to 1000.

5. The laminate film according to claim 1, wherein the oxygen transmission coefficient of the cured product obtained by curing the composition is at most 2.0 ml·mm/m$^2$·day·MPa (23° C., 60% RH).

6. The laminate film according to claim 1, wherein the epoxy resin is at least one selected from an epoxy resin having a glycidylamino group derived from meta-xylylenediamine, an epoxy resin having a glycidylamino group derived from 1,3-bis(aminomethyl)cyclohexane, an epoxy resin having a glycidylamino group derived from diaminodiphenylmethane, an epoxy resin having a glycidylamino group and/or a glycidyloxy group derived from para-aminophenol, an epoxy resin having a glycidyloxy group derived from bisphenol A, an epoxy resin having a glycidyloxy group derived from bisphenol F, an epoxy resin having a glycidyloxy group derived from phenol-novolak, and an epoxy resin having a glycidyloxy group derived from resorcinol.

7. The laminate film according to claim 1, wherein the epoxy resin is an epoxy resin having a glycidylamino group derived from meta-xylylenediamine.

8. A multilayer wrapping material containing at least one unit of the laminate film of claim 1.

9. A wrapping bag formed by using the multilayer wrapping material of claim 8, in which the wrapping material has a heat-sealable resin layer, and in which the wrapping material is overlaid on each other in such a manner that the surface of the heat-sealable resin layer thereof could face each other, and the edges of the outer peripheral area thereof are heat-sealed to form a sealed part.

* * * * *